United States Patent [19]

Harris

[11] Patent Number: 5,448,403
[45] Date of Patent: Sep. 5, 1995

[54] BINARY DIFFRACTIVE OPTICAL ELEMENT SCANNER

[75] Inventor: Ellis D. Harris, Claremont, Calif.

[73] Assignee: Xerox Corporation, Stamford, Conn.

[21] Appl. No.: 225,415

[22] Filed: Apr. 8, 1994

Related U.S. Application Data

[63] Continuation of Ser. No. 989,445, Dec. 11, 1992, abandoned.

[51] Int. Cl.⁶ .................. G02B 5/18; G02B 26/10; G02B 27/44
[52] U.S. Cl. ................... 359/562; 359/18; 359/209; 359/565
[58] Field of Search .............. 359/17, 18, 19, 565, 359/566, 569, 562, 209

[56] References Cited

U.S. PATENT DOCUMENTS

| | | |
|---|---|---|
| 3,619,033 | 11/1971 | McMahon ............ 350/162 |
| 4,289,371 | 9/1981 | Kramer ............ 350/3.71 |
| 4,428,643 | 1/1984 | Kay ............ 359/18 |
| 4,678,263 | 7/1987 | Funato ............ 350/3.71 |
| 4,758,058 | 7/1988 | Cato et al. ............ 350/3.71 |
| 4,810,046 | 3/1989 | Yamagishi et al. . |
| 4,895,790 | 1/1990 | Swanson et al. ............ 430/321 |
| 4,948,213 | 8/1990 | Hasegawa et al. ............ 359/18 |
| 5,073,007 | 12/1991 | Kedmi et al. ............ 359/565 |
| 5,182,659 | 1/1993 | Clay et al. ............ 359/18 |

OTHER PUBLICATIONS

W. Veldkamp & T. McHugh, "Binary Optics", *Scientific American*, vol. 266, No. 5, May 1992, pp. 92–97.

G. J. Swanson, "Binary Optics Technology: The Theory and Design of Multi-Level Diffractive Optical Elements", Lincoln Laboratory, Massachusetts Institute of Technology, *Technical Report 854*, 14 Aug. 1989.

*Primary Examiner*—Martin Lerner
*Attorney, Agent, or Firm*—William Propp

[57] ABSTRACT

An optical scanning system uses a stationary binary diffractive optical element and a rotating binary diffractive element to focus and scan a beam along the scan line.

10 Claims, 3 Drawing Sheets

CROSS-SCAN (SAGITTAL)

SCAN (TANGENTIAL)

BINARY DIFFRACTIVE OPTICAL ELEMENT SCANNER

This is a continuation of application Ser. No. 07/989,445, filed Dec. 11, 1992 and now abandoned.

BACKGROUND OF THE INVENTION

This invention relates to an optical scanner, and, more particularly, to an optical scanner with binary diffractive optical elements used to scan a beam along a line.

The propagation of a light beam can be changed by three basic means: reflection by a mirror, refraction by a lens and diffraction by a grating. Optical systems traditionally rely on reflection and refraction to achieve the desired optical transformation. Optical design, based on mirror and lens elements, is a well-established and refined process. Until recently, the problems with diffraction and fabricating high efficiency diffractive elements have made diffractive elements unfeasible components of optical systems.

The diffractive process does not simply redirect a light beam. Diffraction, unlike refraction and reflection, splits a light beam into many beams—each of which is redirected at a different angle or order. The percentage of the incident light redirected by the desired angle is referred to as the diffraction efficiency. The diffraction efficiency of a diffractive element is determined by the element's surface profile. If the light that is not redirected by the desired angle is substantial, the result will be an intolerable amount of scatter in the image or output plane of the optical system.

Theoretically, diffractive phase elements can achieve 100 percent diffraction efficiency at a given wavelength. To achieve this efficiency, however, a continuous phase profile is necessary. The theoretical diffraction efficiency of this surface profile is also relatively sensitive to a change in wavelength. By contrast, refractive elements are wavelength insensitive. The technology for producing high quality, high efficiency, continuous phase profiles does not presently exist.

A compromise that results in a relatively high diffraction efficiency and ease of fabrication is a multi-level phase grating. The larger the number of discrete phase levels, the better the approximation of the continuous phase function. These multi-level phase profiles can be fabricated using standard semiconductor integrated circuit fabrication techniques.

As disclosed in *Binary Optics Technology: The Theory and Design of Multi-level Diffractive Optical Elements* by G. J. Swanson of the Lincoln Laboratory at the Massachusetts Institute of Technology, (Technical Report 854, 14 Aug. 1989) and the resulting U.S. Pat. No. 4,895,790, a fabrication process for a binary diffractive optical element or multi-level phase profile diffraction grating starts with a mathematical phase description of a diffractive phase profile and results in a fabricated multi-level diffractive surface. The first step is to take the mathematical phase expression and generate from it a set of masks that contain the phase profile information. The second step is to transfer the phase profile information from the masks into the surface of the element specified by the lens design.

The first step involved in fabricating the multi-level element is to mathematically describe the ideal diffractive phase profile that is to be approximated in a multi-level fashion. The next step in the fabrication process is to create a set of lithographic masks which are produced by standard pattern generators used in the integrated circuit industry.

A substrate of the desired material is coated with a thin layer of photoresist. The lithographic mask is then placed in intimate contact with the substrate and illuminated from above with an ultraviolet exposure lamp. Alternately, pattern generators, either optical or electron beam, can expose the thin layer of photoresist. The photoresist is developed, washing away the exposed resist and leaving the binary grating pattern in the remaining photoresist. This photoresist will act as an etch stop.

The most reliable and accurate way to etch many optical materials is to use reactive ion etching. The process of reactive ion etching anisotropically etches material at very repeatable rates. The desired etch depth can be obtained very accurately. The anisotropic nature of the process assures a vertical etch, resulting in a true binary surface relief profile. Once the substrate has been reactively ion etched to the desired depth, the remaining photoresist is stripped away, leaving a binary phase surface relief grating.

The process is repeated using a lithographic mask having half the period of the first mask. The binary phase element is recoated with photoresist and exposed using the second lithographic mask which has half the period of the first mask. After developing and washing away the exposed photoresist, the substrate is reactively ion etched to a depth half that of the first etch. Removal of the remaining photoresist results in a 4 level approximation to the desired profile. The process is repeated a third and fourth time with lithographic masks having periods of one-quarter and one-eighth that of the first mask, and etching the substrates to depths of one-quarter and one-eighth that of the first etch. The successive etches result in elements having 8 and 16 phase levels.

This process is repeated to produce a multilevel phase relief structure in the substrate. The result is a discrete, computer-generated structure approximating the original idealized diffractive surface. For each additional mask used in the fabrication process, the number of discrete phase levels is doubled, hence the name "binary" optical element or, more precisely, a binary diffractive optical element.

After only four processing iterations, a 16 phase level approximation to the continuous case can be obtained. This mask and etch fabrication process can be carried out in parallel, producing many elements simultaneously, in a cost-effective manner.

A 16 phase level structure achieves 99 percent diffraction efficiency. The residual 1 percent of the light is diffracted into higher orders and manifests itself as scatter. In many optical systems, this is a tolerable amount of scatter. The fabrication of the 16 phase level structure is relatively efficient due to the fact that only four processing iterations are required to produce the element.

The photolithographic etch steps can be done in any order. Alternatively, the highest pitch, shallowest level is processed first since this level is more difficult to control if etched following deeper etches.

After the first etching step, the second and subsequent lithographic masks have to be accurately aligned to the existing pattern on the substrate. Alignment is accomplished using another tool standard to the integrated circuit industry, a mask aligner.

As noted, the photoresist on the substrate can be exposed with an electron-beam pattern generator. The e-beam direct-write process eliminates masks and their corresponding alignment and exposure problems. Binary optics have also been reproduced using epoxy casting, solgel casting, embossing, injection molding and holographic reproduction.

Binary optical elements have a number of advantages over conventional optics. Because they are computer-generated, these elements can perform more generalized wavefront shaping than conventional lenses or mirrors. Elements need only be mathematically defined no reference surface is necessary. Therefore, wildly asymmetric binary optics are able to correct aberrations in complex optical systems, and elements can be made wavelength-sensitive for special laser systems.

The diffractive optical elements are generally thinner, lighter and can correct for many types of aberrations and distortions. It is possible to approximate a continuous phase profile with a stepwise profile of discrete phase levels.

Optical scanning systems are used to scan a spot of light along a predetermined pattern such as a scan line on a photoreceptor. A reflective optical scanning system would be a rotating polygon mirror scanner known to those of ordinary skill in the art. However, even a reflective optical scanning system still requires additional optical components, usually refractive lenses and other reflective mirrors both before the rotating polygon mirror and after the rotating polygon mirror to be able to scan a beam of light across the scan line.

Many systems have been disclosed in the art to overcome various optical and other distortions caused by rotating polygon mirror optical scanners. Bow is defined as an error in the optical scanning system caused by the beam not being exactly horizontal prior to striking the facet. The scan line deviates from a straight line and is bowed in the middle of the scan line. Wobble is caused by the facet not being exactly parallel to the vertical axis, thereby angling the beam reflected from the facet up or down a small amount.

A rotating hologram would be a diffractive optical scanning system and is known to those of ordinary skill in the art. However, even a holographic optical scanning system still requires additional optical components, usually refractive lenses and reflective mirrors both before the rotating hologram and after the rotating hologram to be able to scan a beam of light across the scan line.

Rotating a polygon mirror or a hologram requires a number of additional optical components which reduces the net optical beam throughput and increases the size and cost of the optical scanning system.

It requires a significant amount of drive power and bearing load to rotate a polygon mirror. Consistent high speeds needed for faster and more scans present problems.

Wobble and shaft mounting errors are always a problem when rotating a thick, heavy, aerodynamically resistant structure such as a polygon mirror.

It is an object of this invention to provide an optical scanning system using binary diffractive optical elements.

It is another object of this invention to provide an optical scanning system with a reduced number of optical components and no optical components after the scanning element.

SUMMARY OF THE INVENTION

In accordance with the present invention, an optical scanning system uses a stationary binary diffractive optical element to condition a light beam for input to a rotating binary diffractive element to focus and scan the beam along the scan line. A light source and a collimating lens provide the incident beam for the two binary diffractive optical elements. The scanning beam is the first order diffracted beam and a stop blocks the zero order, nondiffracted beam as well as undesirable higher order diffracted beams.

Other objects and attainments together with a fuller understanding of the invention will become apparent and appreciated by referring to the following description and claims taken in conjunction with the accompanying drawings.

DESCRIPTION OF THE PREFERRED EMBODIMENT

Figure 1:
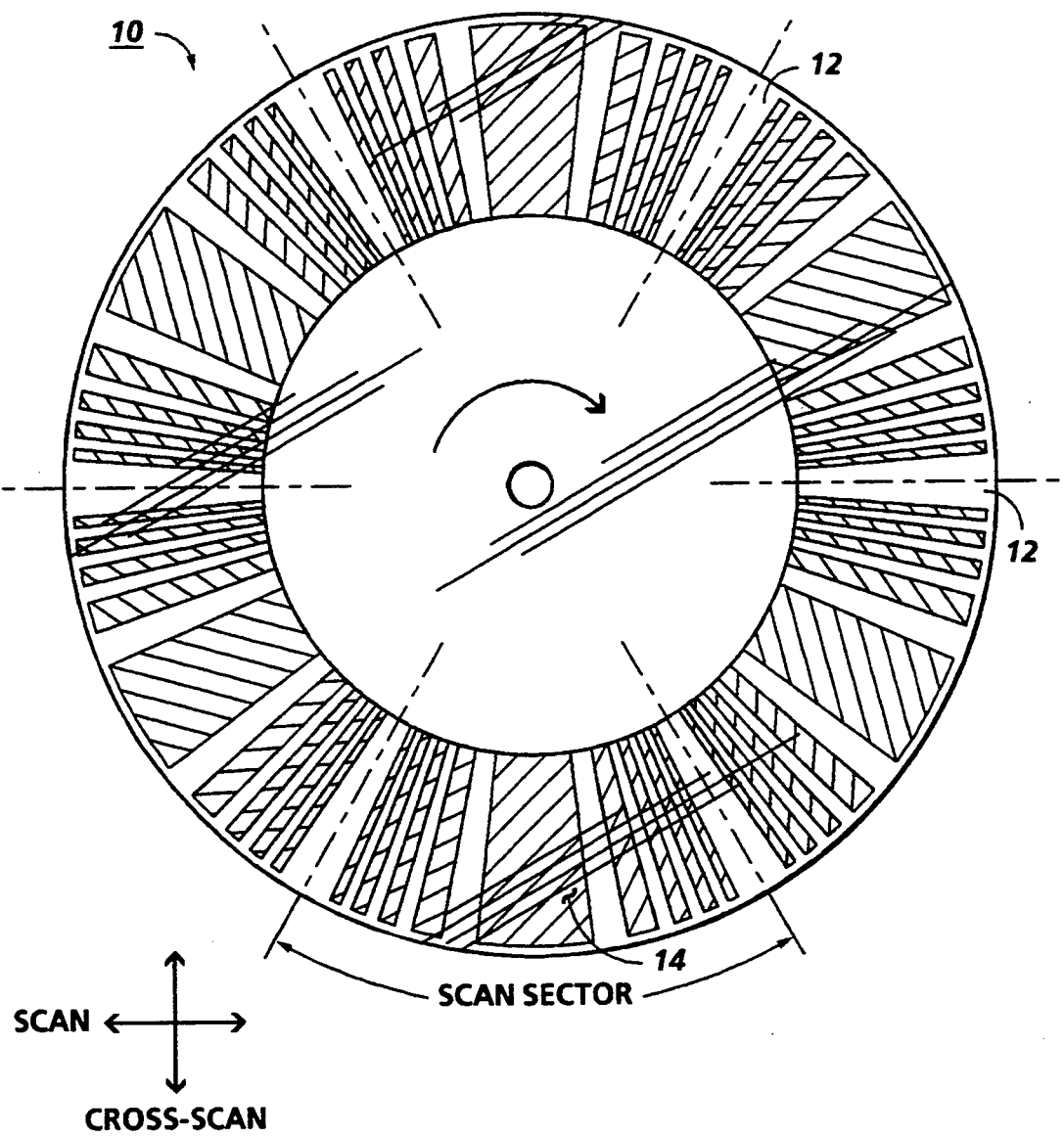
FIG. 1 is a schematic illustration of the binary diffractive optical element disc for an optical scanner formed according to the present invention.

Reference is now made to FIG. 1, wherein there is illustrated a rotatable transparent disc 10 which has a plurality of binary diffractive optical elements 12 circumferentially in annular sectors around the disc to generate a repetitive single scan line. The binary diffractive optical element pattern 14 in each element 12 repeats itself as the scanning beam repeatedly scans across the scan line.

The multilevel phase relief structure 14 of the binary diffractive optical element 12 is along a radius of the rotating disc and is essentially parallel to the cross-scan (sagittal) plane and diffract light into the scan (tangential) plane.

Figure 2:
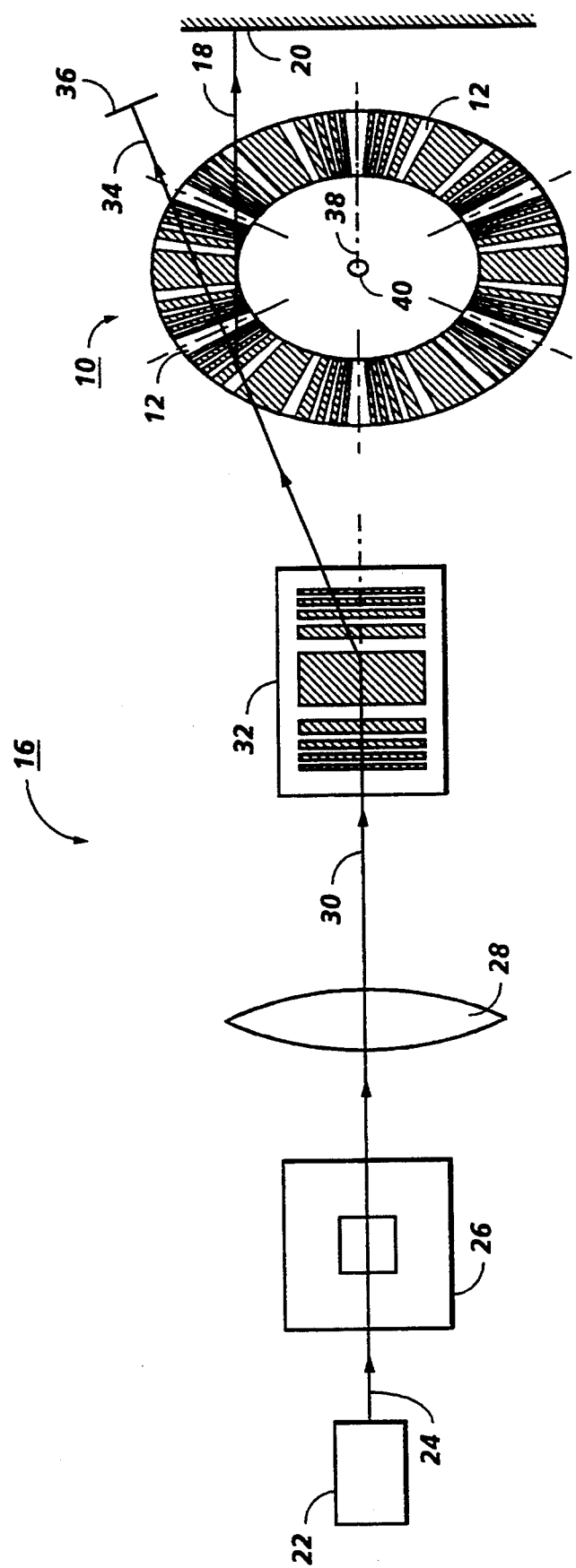
FIG. 2 is a schematic illustration of the optical scanning system using a rotating binary diffractive optical element disc formed according to the present invention.

The optical scanning system 16 of FIG. 2, which scans a light beam 18 across a scan line 20, has a light source 22 which emits a coherent light beam 24. The coherent light beam 24 propagates through a beam control aperture 26 and is collimated by collimating lens 28. The resulting collimated beam 30 is then incident upon a stationary first binary diffractive element 32 which primarily conditions the collimated beam and then incident upon the second binary diffractive optical elements 12 of the rotating disc 10 which primarily focuses and scans the output beam 18 across the scan line 20. The first order diffracted light 18 diffracted by the binary diffractive optical elements 12 will form the scanning beam while the zero order, undiffracted light beam 34 from the binary diffractive optical elements 12 will be blocked by a stop 36.

Figure 3:
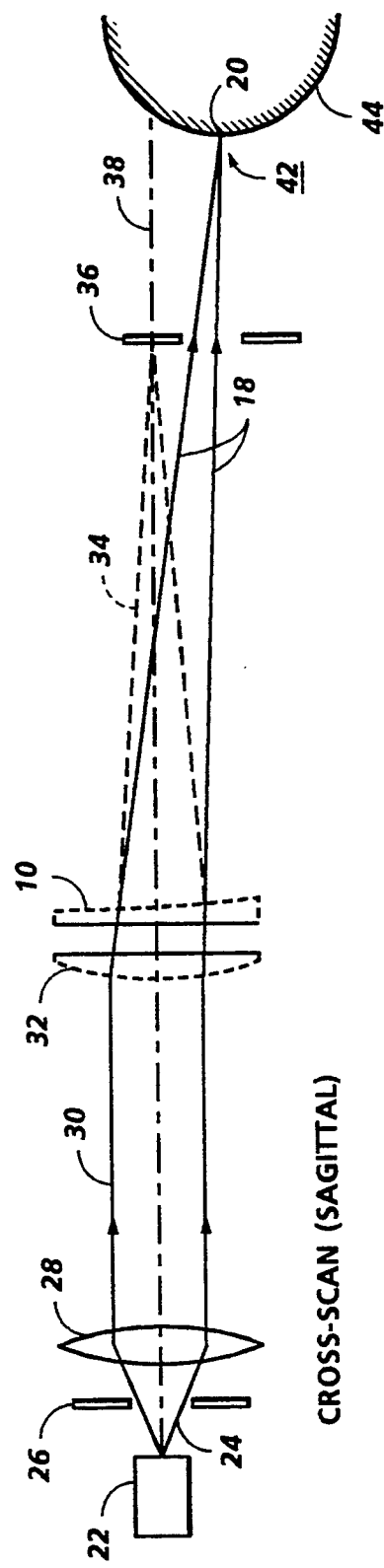
FIG. 3 is a schematic illustration of the incident and scanning beams in the scan and cross-scan planes passing through the optical scanning system of FIG. 2.
Figure 3:
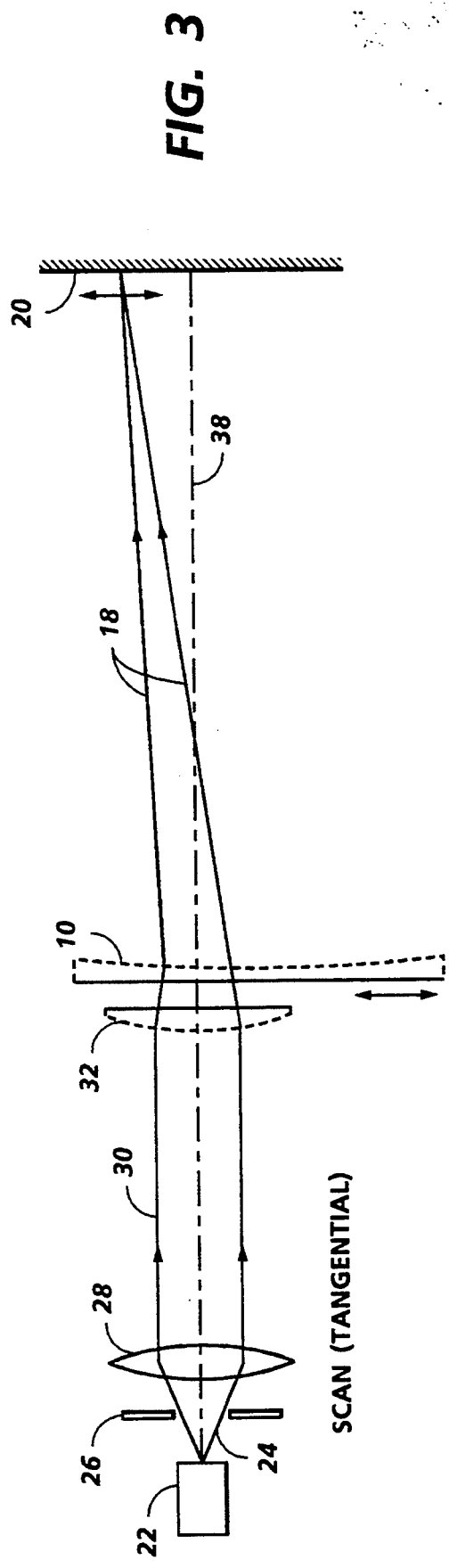

FIG. 3 shows the optical path through the binary diffractive optical elements optical scanning system 16 in the scan and cross-scan planes. With reference to FIGS. 2 and 3, the light source 22, such as a visible light diode laser, emits a coherent light beam 24 of a single wavelength.

The light beam 24 then propagates through a beam control aperture 26 which may block portions of the beam. The beam control aperture reduces the effects of angular beam spread from the light source 22. The light beam is then collimated by a collimating lens 28 such as a molded glass aspherical collimating lens. Due to the beam spread difference in the scan and cross-scan planes, the collimated beam cross-section cannot be circular with a symmetric collimator lens. The larger beam diameter should be in the scan (tangential) plane allowing the scan spot size to be small. The spot grows in this axis due to motion blur.

The optical scanning system 16 is based on two multifunctional binary diffractive optical elements 32 and 12. The stationary binary diffractive element 32 precedes the rotating binary diffractive optical elements 12. Together these two binary diffractive optical elements focus an incident collimated beam at the scan line and scan the resulting spot over the scan line. The two binary diffractive optical elements also correct for optical aberrations in the beam.

The collimated, still coherent beam 30 is then incident upon a stationary binary diffractive optical element 32. The BDO element 32 provides the primary optical conditioning in both the scan (tangential) and cross-scan (sagittal) planes for the scanning beam (the first order diffracted beam). The stationary binary diffractive optical element need not be a disc.

The nature of binary diffractive optics technology allows multiple optical functions to be incorporated in each binary diffractive optical element enabling compensation and correction as required.

The incident light 18 diffracted by the rotating binary diffractive optical element 12 from the beam axis in the the scan (tangential) plane will experience a cross-scan (sagittal) component in this diffraction. This can be calculated and corrected earlier in the optical path by the stationary binary diffractive optical element 32.

As shown in FIG. 1, the pitch or distance between adjacent binary diffractive optical elements 12 is smaller nearer the center of rotation of the rotating binary diffractive optical element resulting in a larger angle of diffraction. This effect can be calculated and corrected earlier in the optical path by the stationary binary diffractive optical element 32.

The beam 30 in FIG. 2 diffracted and consequently conditioned by the stationary first binary diffractive optical element 32 is incident upon the second binary diffractive optical elements 12 of the rotating disc 10. The rotating binary diffractive optical element will diffract the beam 30 to cause resulting beam 18 to focus upon the scan line 20 and to scan across the scan line 20. The BDO element 12 provides the primary optical focussing in both the scan (tangential) and cross-scan (sagittal) planes for the scanning beam (the first order diffracted beam). The binary diffractive optical element 12 is underfilled in that the incident beam's cross-section is considerably smaller than the binary diffractive optical element 12.

The incident light beam typically has a normal or perpendicular angle of incidence to the rotating binary diffractive optical element disc. The incident beam can be at the Bragg angle of incidence to reduce loss as the beam strikes the front surface of the rotating binary diffractive optical element disc. The incident beam can, however, have any angle of incidence to the rotating binary diffractive optical element disc.

The disc 10 is rotatable about an axis of rotation 38. The rotating disc is driven at a constant speed by a motor (not shown) coupled to the rotor 40 along the axis of rotation of the disc. The rotational movement of the disc relative to the incident light beam produces a scan beam 18 which sweeps along a scan line 20 determined by incident light beam 30 being diffracted by the binary diffractive optical element 12.

The rotating binary diffractive optical element 12 includes a negative binary diffractive lens element repeated in the sections of the annulus. The lens' effective focal length is a function of the radius, areas nearer the rotor have shorter focal lengths. This variable effective focal length, increasing as the radius of the binary diffractive optical element 12 on the disc increases, is compensated by the stationary binary diffractive optical element 32. The effect of the binary diffractive optical element is to bring the scanning beam to a focus along the scan line. The binary diffractive optical element acts to diffract the incident light beam to a locus of focal points which define the scan line.

The first order diffracted light 18 diffracted by the binary diffractive optical elements 12 will form the scanning beam 18 while the zero order, undiffracted light beam 34 from the binary diffractive optical elements 12 will be blocked by a stop 36.

As shown in FIG. 3, the scanning beam 18 scans across a straight line 20 in the scan (tangential) plane while focussed at a point 42 on the curved surface 44 which is perpendicular to the scan line 18. This scan pattern would be a scan line on a photoreceptor drum for example. The surface 44 in the cross-scan (sagittal) plane need not be curved but can be flat or some other shape.

Each binary diffractive optical element 12 in the annular ring around the periphery of the disc 10 serves the function of the facet in a rotating polygon mirror scanner.

As shown in FIG. 1, each of the phase levels in the multilevel phase relief structure 14 of the binary diffractive optical element 12 is a diffractive grating with the pitch varying over the entire element. As the element rotates, the multilevel phase relief structure 14 of the binary diffractive optical element moves through an incident light beam and this beam is deflected according to the local pitch, resulting in a scan of the beam. The pitch variation is determined such that scan position on the scan line is a linear function of scanner rotation angle.

The rotating binary diffractive optical element 12 has a component in the cross-scan (sagittal) plane to remove scan line bow providing a linear scan.

Not all of the optical flux in a light beam is diffracted into the first order beam, the scanning beam 18. A wedge effect is incorporated in the rotating binary diffractive optical element 12 in the cross-scan (sagittal) plane to insure that the first order diffracted beam can be physically and optically separated from the zero order, nondiffracted beam 34 and other unwanted diffraction orders.

The zero order, nondiffracted beam 34 as well as any undesirable diffraction orders from the binary diffractive optical elements 12 will be blocked by a stop 36. The first order diffracted light 18 diffracted by the binary diffractive optical elements 12 will scan across the scan line 20. Since the blocked zero order beam is along the optical axis and the scanning first order beam is off-axis, the optical scanning system 16 is an off-axis scanning system.

The binary diffractive optical element pattern 14 in each element 12 provides a single scan across the scan line. If the pattern is repeated in each element, the scanning beam repeatedly scans across the scan line.

Alternately, since the nature of binary diffractive optics technology allows multiple optical functions to be incorporated in each binary diffractive optical element, with the same optical elements in the structure and the same optical path, the stationary binary diffractive optical element 32 can provide the primary optical focussing in both the scan (tangential) and cross-scan (sagittal) planes for the scanning beam (the first order diffracted beam) on the scan line and the rotating binary diffractive optical element 12 can provide the primary optical scanning of the beam across the scan line.

The spectral dispersion can be compensated by coordinating the positive dispersion of the glass collimating lens 28 with the negative dispersion inherent in binary diffractive optical elements 32 and 12.

The rotating binary diffractive optical element 12 need not be a negative optical element but can instead, be a positive element. A positive element would work with the stationary binary diffractive optical element 32 to achieve focussing of the incident beam.

It is not necessary that the scan pattern produced by the rotating binary diffractive optical element optical scanning system be a scan line. The scan pattern produced by this optical scanner could be another open pattern such as a zig-zag or a closed pattern such as a circle, a figure-8 or a diamond.

The primary advantages of the rotating binary diffractive optical element scanner is the low cost and small size resulting from the reduced number of optical components compared to a typical rotating polygon mirror or hologram scanner. Net optical throughput is improved as a result of fewer optical elements.

An additional advantage results from the use of a thin circular disc rather than a thicker polygon mirror structure as the rotating element. Acoustic noise is significantly reduced as well as drive power and bearing load. Higher rotational speed is possible.

Unlike a holographic scanner, the scanning optics are included in the rotating element with the binary diffractive optical element. As a result of the lack of optics beyond the scanner, the over all size is reduced significantly relative to a typical rotating polygon mirror scanner or a holographic scanner, both of which must incorporate optics beyond the scanning element to scan a light beam along a scan line.

Since the scanning element is a transmissive disc having parallel plane faces, this structure when rotated provides a natural resistance to bearing wobble and shaft mounting errors.

While the invention has been described in conjunction with specific embodiments, it is evident to those skilled in the art that many alternatives, modifications and variations will be apparent in light of the foregoing description. Accordingly, the invention is intended to embrace all such alternatives, modifications and variations as fall within the spirit and scope of the appended claims.

What is claimed is:

1. An optical scanner for scanning a light beam along a scan line comprising:
   a light source for emitting a coherent light beam,
   means to collimate said coherent light beam,
   a first stationary binary diffractive optical element to condition said collimated light beam,
   a rotating disc with a plurality of second binary diffractive optical elements to diffract said light beam from said first stationary binary diffractive optical element to focus and scan along said scan line, wherein said diffracted beam to scan along said scan line is the first order diffracted beam, and
   means to block light from said plurality of second binary diffractive optical elements which is not diffracted into said first diffraction order to scan along said scan line.

2. The optical scanner for scanning a light beam along a scan line of claim 1 wherein plurality of second binary diffractive optical elements separates said first order diffracted beam from a zero order, nondiffracted beam and other diffraction order beams.

3. The optical scanner for scanning a light beam along a scan line of claim 1 wherein said plurality of second binary diffractive optical elements are negative elements.

4. The optical scanner for scanning a light beam along a scan line of claim 1 wherein said plurality of second binary diffractive optical elements are positive elements.

5. The optical scanner for scanning a light beam along a scan line of claim 1 wherein the multilevel phase relief structure of said plurality of second binary diffractive optical elements are along a radius of said rotating disc to diffract said light beam along said scan line.

6. An optical scanner for scanning a light beam along a scan line comprising:
   a light source for emitting a coherent light beam,
   means to collimate said coherent light beam,
   a first stationary binary diffractive optical element to condition and focus said collimated light beam along said scan line,
   a rotating disc with a plurality of second binary diffractive optical elements to diffract said light beam from said first stationary binary diffractive optical element to scan along said scan line, wherein said diffracted beam to scan along said scan line is the first order diffracted beam, and
   means to block light from said plurality of second binary diffractive optical elements which is not diffracted into said first diffraction order to scan along said scan line.

7. The optical scanner for scanning a light beam along a scan line of claim 6 wherein plurality of second binary diffractive optical elements separates said first order diffracted beam from a zero order, nondiffracted beam and other diffraction order beams.

8. The optical scanner for scanning a light beam along a scan line of claim 6 wherein said plurality of second binary diffractive optical elements are negative elements.

9. The optical scanner for scanning a light beam along a scan line of claim 6 wherein said plurality of second binary diffractive optical elements are positive elements.

10. The optical scanner for scanning a light beam along a scan line of claim 6 wherein the multilevel phase relief structure of said plurality of second binary diffractive optical elements are along a radius of said rotating disc to diffract said light beam along said scan line.

* * * * *